C. M. & J. H. SCHWARTZ.
REAMING BIT.
APPLICATION FILED FEB. 11, 1910.
981,227.
Patented Jan. 10, 1911.
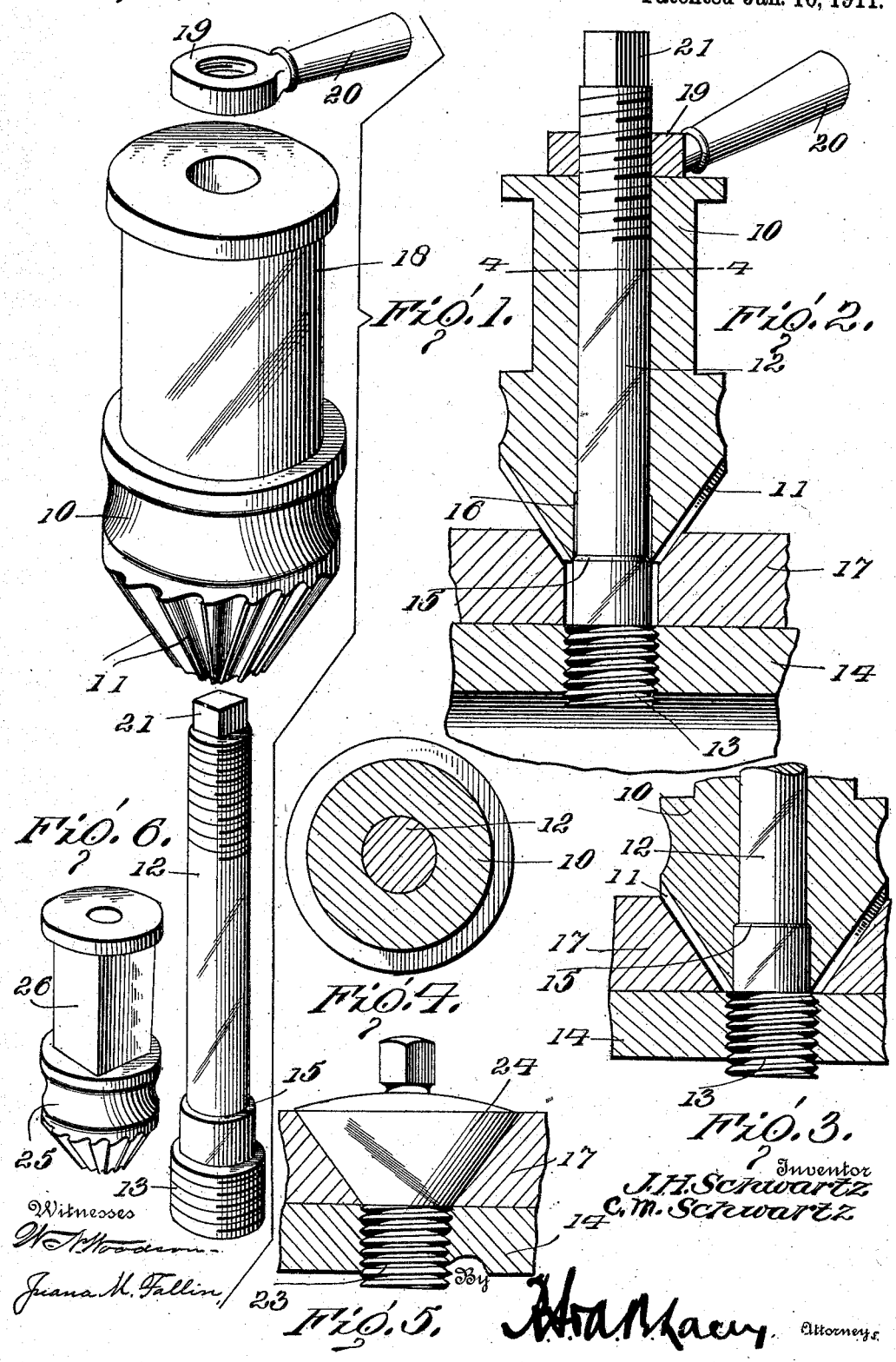

UNITED STATES PATENT OFFICE.

CHARLES M. SCHWARTZ AND JOHN H. SCHWARTZ, OF CHEBOYGAN, MICHIGAN.

REAMING-BIT.

981,227.  Specification of Letters Patent.  Patented Jan. 10, 1911.

Application filed February 11, 1910. Serial No. 543,412.

*To all whom it may concern:*

Be it known that we, CHARLES M. SCHWARTZ and JOHN H. SCHWARTZ, citizens of the United States, residing at Cheboygan, in the county of Cheboygan and State of Michigan, have invented certain new and useful Improvements in Reaming-Bits, of which the following is a specification.

This invention relates to metal working tools and refers particularly to an improved reaming bit.

The invention has for an object to provide an improved reaming bit particularly for use in the repair of boilers, for the purpose of preparing openings through the boiler plate and the "patching" plate for the reception of bolts of peculiar construction which are employed for sealing the plates against one another.

The invention further contemplates the provision of a reamer with means for limiting the feeding of the same so as to enlarge the opening through the outer plate only, to receive a bolt having a tapered head and a threaded and reduced shank.

For a full understanding of the invention reference is to be had to the following description and accompanying drawings, in which:—

Figure 1 is a perspective view of the parts detached one from the other. Fig. 2 is a longitudinal section through the reaming bit in its initial cutting position. Fig. 3 is a detail sectional view of the same disclosing the bit at the end of the cutting movement. Fig. 4 is a section on the line 4—4 of Fig. 2, and Fig. 5 is a section of the boiler plates after reaming and disclosing a bolt secured therethrough. Fig. 6 is a perspective view of a slightly modified form of the broach.

Corresponding and like parts are referred to in the following description and indicated in all the views of the accompanying drawing by the same reference characters.

Referring to the drawing the numeral 10 designates a broach which is provided at its lower end with a tapered portion having annular cutting edges 11. This broach 10 is provided centrally with a bore or circular opening through which a guide 12 is loosely positioned to admit of the free movement of the broach 10 longitudinally thereon. The guide 12 comprises an elongated shank having a circular cross-section and which is provided with an enlarged threaded portion 13 at its lower end to engage in a threaded aperture which is formed through the inner boiler plate 14, the enlarged portion 13 being extended inwardly upon the guide 12 beyond the threaded portion to form a shoulder 15.

From Fig. 2 it will be observed that the lower end of the broach 10 is centrally enlarged as at 16 to accommodate the enlarged portion 13 of the guide 12, the enlarged portion 16 extending inwardly but a short distance in order to limit the downward movement of the broach 10 upon the guide 12. The cutting edges 11 are thus stopped from movement over the threaded portion of the guide 12 and are thereby prevented from entering the inner boiler plate 14 after passing through the outer plate 17. The broach 10 is disclosed in Fig. 3 in its lowermost position upon the guide 12, wherein the shoulder 15 is abutted against the annular shoulder formed within the enlarged portion 16 and the lower ends of the cutting edges 11 are flush with the lower face of the upper plate 17. The broach 10 is provided with a gripping face 18 for the reception of a wrench or other suitable tool by means of which the broach is rotated. The upper end of the guide 12 is externally threaded to receive a feed-nut 19 for engagement against the upper end of the broach 10 to force the same downwardly and to bind the cutting edges 11 against the plate 17. The feed-nut 19 is provided with a handle 20 by means of which the feed-nut may be rotated during the operation of the reaming bit. The upper extremity of the guide 12 is provided with an angular head 21 through the medium of which the guide is positioned in the threaded aperture formed through the inner plate 14.

In Fig. 5 is disclosed the formation of a bolt which is employed in sealing the plates 14 and 17 to one another, the bolt comprising a threaded shank 23 having a tapered head 24, the inclination of the sides of the head 24 corresponding to the angle in which the cutting edges 11 are disposed.

In the operation of the device the boiler plates 14 and 17 are first arranged in registered relation when the same are apertured by means of a bit of common formation. The guide 12 is now engaged in the apertures in the plates 14 and 17 until the entire threaded portion of the guide is disposed within the outer face of the plate 14. The broach 10 is now engaged over the upper end of the guide 12 and permitted to fall upon the outer face of the plate 17. The feed-nut 19 is now disposed in threaded engagement over the outer end of the guide 12 to force the angular cutting edges 11 against the plate 17. A suitable tool engages about the gripping face 18 of the broach in order to rotate the same to cause the biting of the cutting edges 11 within the plate 17. The feed-nut 19 is rotated to force the cutting edges 11 against the plate 17 until the shoulder 15 strikes the shoulder formed within the broach when the downward movement of the broach will be stopped.

Fig. 3 discloses the reaming bit adjusted at the end of its cutting movement wherein the shoulders are engaged with one another. The broach 10 is now withdrawn together with the guide 12 from the openings formed in the plates 14 and 17 when the shank 23 is secured into the plate 14 to bind the tapering head 24 within the beveled portion formed through the plate 17.

In the modification disclosed in Fig. 6 the broach 25 is provided with angular faces 26 at its central portion for the reception of a correspondingly formed tool. This modification differs from the preferred form only in the provision of these faces. The preferred form necessitates the employment of a pipe wrench, while the modification adapts the reaming bit to nut wrenches more commonly employed.

Having thus described the invention what is claimed as new is:—

A reaming bit including a broach having a tapering lower end with cutting edges on its outer face and having a central bore being enlarged at its lower end to form a downwardly facing annular shoulder within the broach, a guide passing through the bore in the broach and having an enlarged and threaded lower portion and an annular shoulder spaced upwardly from the threaded portion to seat against the downwardly facing shoulder of the broach to limit the downward movement of the broach to protect the threaded portion.

In testimony whereof we affix our signatures in presence of two witnesses.

CHARLES M. SCHWARTZ. [L. S.]
JOHN H. SCHWARTZ. [L. S.]

Witnesses:
VET. S. MOLONEY,
F. HILBORN.